United States Patent
Feld (12) United States Patent (10) Patent No.: US 9,160,209 B2
Feld (45) Date of Patent: Oct. 13, 2015

(54) BLOWER FOR DOWNDRAFT COOKING APPLICATIONS AND ASSOCIATED METHOD OF USE

(75) Inventor: Mark Anthony Feld, Cassville, MO (US)

(73) Assignee: Regal Beloit America, Inc., Beloit, WI (US)

( * ) Notice: Subject to any disclaimer, the term of this patent is extended or adjusted under 35 U.S.C. 154(b) by 658 days.

(21) Appl. No.: 13/407,372

(22) Filed: Feb. 28, 2012

(65) Prior Publication Data

US 2013/0167826 A1 Jul. 4, 2013

Related U.S. Application Data

(60) Provisional application No. 61/582,030, filed on Dec. 30, 2011.

(51) Int. Cl.
| | |
|---|---|
| *F24C 15/20* | (2006.01) |
| *H02K 7/14* | (2006.01) |
| *F04D 25/08* | (2006.01) |
| *H02K 9/06* | (2006.01) |
| *H02K 11/00* | (2006.01) |

(52) U.S. Cl.
CPC .............. *H02K 7/14* (2013.01); *F04D 25/082* (2013.01); *F24C 15/2042* (2013.01); *H02K 9/06* (2013.01); *H02K 11/0073* (2013.01); *F24C 15/20* (2013.01)

(58) Field of Classification Search
CPC .............................. F24C 15/20; F24C 15/2042
USPC .......... 126/299 D; 406/96, 98, 99; 415/182.1, 415/203, 206
See application file for complete search history.

(56) References Cited

U.S. PATENT DOCUMENTS

| | | | |
|---|---|---|---|
| 2,231,675 A | * | 2/1941 | Lynn ................................ 310/58 |
| 4,074,156 A | * | 2/1978 | Widstrand et al. .............. 310/62 |
| 4,736,729 A | | 4/1988 | Beach |
| 4,750,470 A | | 6/1988 | Beach et al. |
| 4,931,678 A | * | 6/1990 | Lutz ................................ 310/62 |
| 5,119,802 A | | 6/1992 | Cherry et al. |
| 5,190,026 A | | 3/1993 | Doty |
| 5,209,217 A | | 5/1993 | Beach et al. |
| 5,213,091 A | | 5/1993 | Beach |
| 5,287,799 A | | 2/1994 | Pickering et al. |
| 5,301,653 A | | 4/1994 | Gerdes et al. |
| 5,325,842 A | | 7/1994 | Beach et al. |

(Continued)

OTHER PUBLICATIONS http://genteqmotors.com/products/genteq/142r/, Internet Archive Wayback Machine dated Apr. 9, 2012.

*Primary Examiner* — Kenneth Rinehart
*Assistant Examiner* — Gajanan M Prabhu
(74) *Attorney, Agent, or Firm* — Thompson Coburn LLP (57) ABSTRACT

A blower for a downdraft cooktop that includes a blower housing, having a top portion and a bottom portion, which includes an inlet that can be fluidly coupled to a downdraft cooktop and an outlet for removing air from the blower housing, a fan located between the input and the outlet of the blower housing, a motor having a rotor with a shaft, having a top portion and a bottom portion, and a stator, wherein the bottom portion of the rotor is operatively attached to the fan, a rotatable member operatively attached to the top portion of the rotor, and a motor housing enclosing the motor, having a top portion, a bottom portion, at least one inlet opening and at least one outlet opening, wherein air for cooling the motor is drawn through the motor housing without utilizing the air located within the blower housing.

3 Claims, 9 Drawing Sheets

(56) References Cited

U.S. PATENT DOCUMENTS

| | | |
|---|---|---|
| 5,619,982 A | 4/1997 | Kelly et al. |
| 5,742,031 A | 4/1998 | Kelly et al. |
| 6,130,491 A * | 10/2000 | Mitamura et al. .............. 310/62 |
| 6,133,658 A * | 10/2000 | Fisher et al. .................... 310/89 |
| 6,223,740 B1 * | 5/2001 | Kim et al. ................. 126/110 R |
| 6,455,818 B1 | 9/2002 | Arntz et al. |
| 6,522,036 B1 * | 2/2003 | Chen .............................. 310/58 |
| 6,575,157 B1 * | 6/2003 | Shaver ..................... 126/299 D |
| 6,674,051 B2 | 1/2004 | Arntz et al. |
| 6,821,318 B2 | 11/2004 | Khosropour |
| 7,687,748 B2 | 3/2010 | Gagas |
| 7,836,877 B2 | 11/2010 | Gagas et al. |
| 2008/0029081 A1 | 2/2008 | Gagas et al. |
| 2011/0146657 A1 | 6/2011 | Briedis et al. |

\* cited by examiner

BLOWER FOR DOWNDRAFT COOKING APPLICATIONS AND ASSOCIATED METHOD OF USE

CROSS-REFERENCE TO RELATED APPLICATION

This application claims priority of U.S. Provisional Patent Application No. 61/582,030 filed Dec. 30, 2011, which is hereby incorporated herein by reference in its entirety.

BACKGROUND OF THE INVENTION

Typically, blowers for gas and electric downdraft cooktop applications rely on blower dilution air for cooling. There is a significant issue with utilizing dilution air from the blower motor as an intake for cooling the motor since system resistance can result in reversing the motor which expels grease laden air into the cooking environment. Due to insufficient blower performance, a known commercial solution is to use a separate blower for a gas cooking unit and a separate blower for an electric cooking unit associated with the same stove because of insufficient blower performance. In addition, it is important for a blower to be able to pass the Underwriters Laboratories Inc. ("UL") Articulated Finger Probe Test, which was designed to consider accessibility by small children, as well as the UL Knife Probe Test to determine human access to moving or rotating parts.

The present invention is directed to overcoming one or more of the problems set forth above.

SUMMARY OF INVENTION

The present invention is directed to a blower for a downdraft cooktop. The blower includes a blower housing, having a top portion and a bottom portion, which includes an inlet that can be fluidly coupled to a downdraft cooktop and an outlet for removing air from the blower housing, a fan located between the input and the outlet of the blower housing, a motor having a rotor with a shaft, having a top portion and a bottom portion, and a stator, wherein the bottom portion of the rotor is operatively attached to the fan, a rotatable member operative attached to the top portion of the rotor, and a motor housing enclosing the motor, having a top portion, a bottom portion, at least one inlet opening and at least one outlet opening, wherein air for cooling the motor is drawn through the at least one inlet opening of the motor housing through the rotation of the rotatable member and dispelled through the at least one outlet opening of the motor housing so that cooling of the motor does not require direct access to air located within the blower housing.

The present invention is directed to a blower for a downdraft cooktop. The blower includes a blower housing, having a top portion and a bottom portion, which includes an inlet that can be fluidly coupled to a downdraft cooktop and an outlet for removing air from the blower housing, a fan located between the input and the outlet of the blower housing, a motor having a rotor with a shaft, having a top portion and a bottom portion, and a stator, wherein the bottom portion of the shaft for the rotor is attached to the fan and the top portion of the shaft for the rotor is attached to a rotatable member, and a housing for the motor having a top support member, at least one cooling band, a bottom support member, wherein the top support member, the at least one cooling band and the bottom support member are connected together to enclose the rotor and the stator of the motor, and an outer enclosure that is positioned above the rotatable member, wherein the rotatable member can draw air through at least one inlet opening in the outer enclosure in fluid relationship with the top support member and the stator before exiting through at least one outlet opening in the outer enclosure and the rotatable member can draw air through at least one inlet opening in the bottom support member in fluid relationship with the rotor and the stator prior to exiting through at least one outlet opening in the lower portion of the motor housing so that cooling of the motor does not require direct access to air located within the blower housing.

Still yet another aspect of the present invention is that a method for utilizing a blower for a downdraft cooktop is disclosed. The method includes rotating a rotor shaft, having a top portion and a bottom portion, with a motor, enclosed in a housing, wherein the bottom portion of the rotor shaft is operatively attached to a fan located within a blower housing, having an inlet and an outlet, where the fan is capable of drawing air from a downdraft cooktop through the inlet into the blower housing and then through the outlet of the blower housing and the top portion of the rotor shaft is operatively attached to a rotatable member to draw air into the motor housing through at least one inlet opening of the motor housing and dispel the air through at least one outlet opening of the motor housing for cooling of the motor without directly accessing the air from within the blower housing.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

Reference characters in the written specification indicate corresponding items shown throughout the drawing figures.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as to obscure the present invention.

Figure 1:
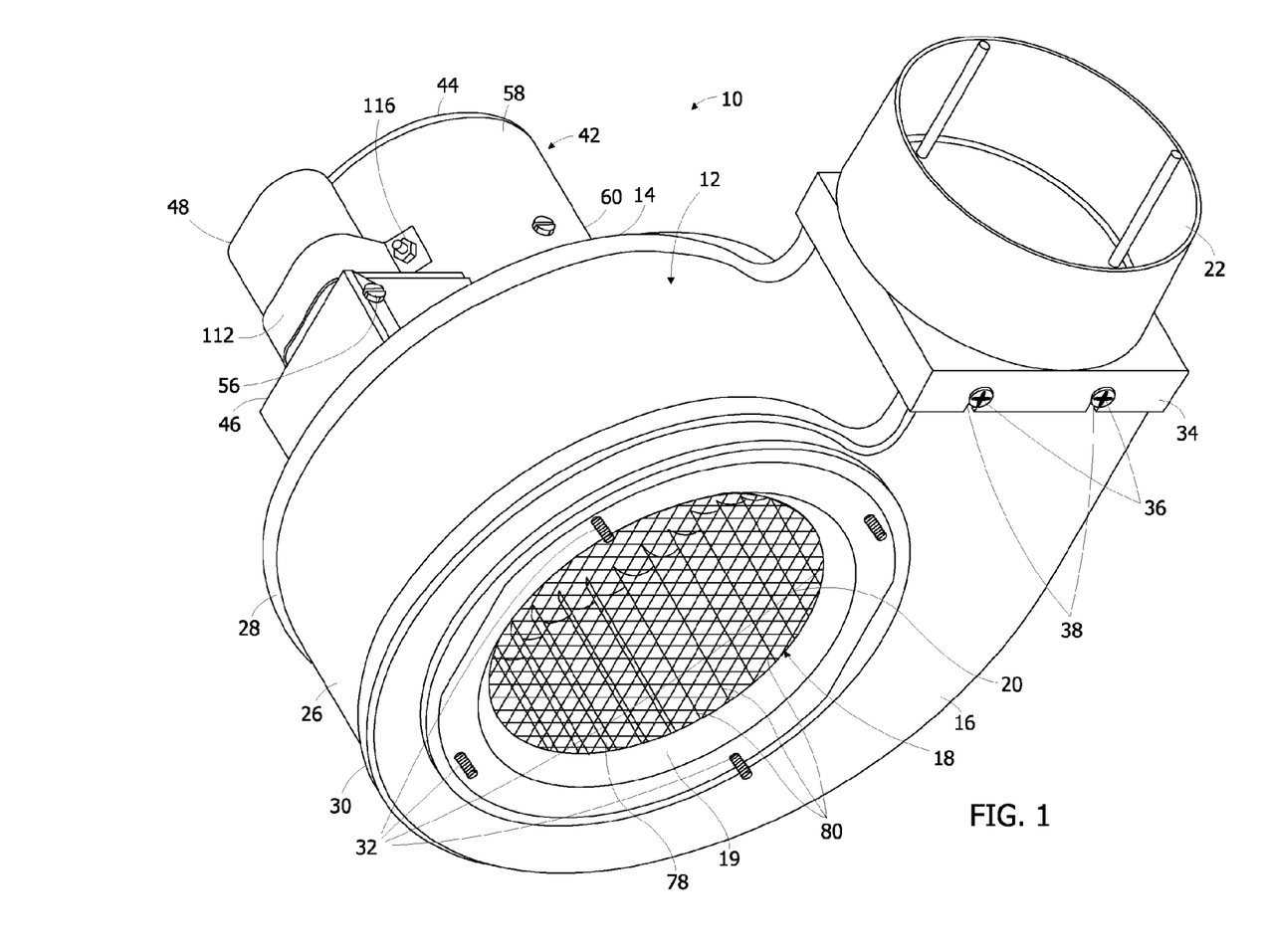
FIG. 1 is a bottom perspective view of a preferred embodiment of a blower for a standard downdraft gas and/or electric cooktop in accordance with the invention.

The preferred embodiment of a blower for a standard downdraft gas and/or electric cooktop is generally indicated by numeral 10 in FIG. 1. There is a housing for the blower that is generally indicated by numeral 12 that has a top portion 14 and a bottom portion 16. There is an inlet 18 that draws in smoke, fumes and other airborne discharge created during the cooking process. A wide variety of geometric shapes will suffice, but a circular shape is preferred. There is an inlet screen 20 that prevents physical objects from going into the blower 10. There is an outlet 22 for removing smoke, fumes and other airborne discharge created during the cooking process from the blower 10 that was received through the inlet 18.

Figure 2:
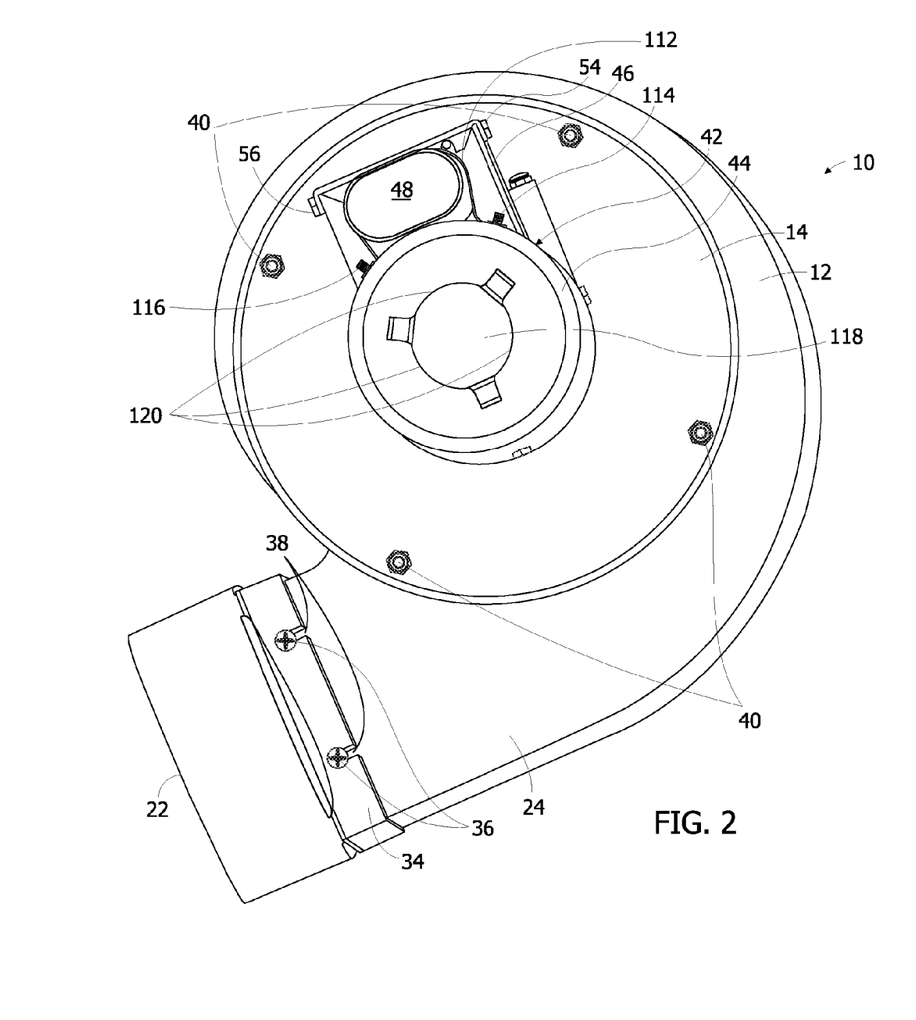
FIG. 2 is a top perspective view of a preferred embodiment of a blower for a standard downdraft gas and/or electric cooktop in accordance with the invention.
Figure 3:
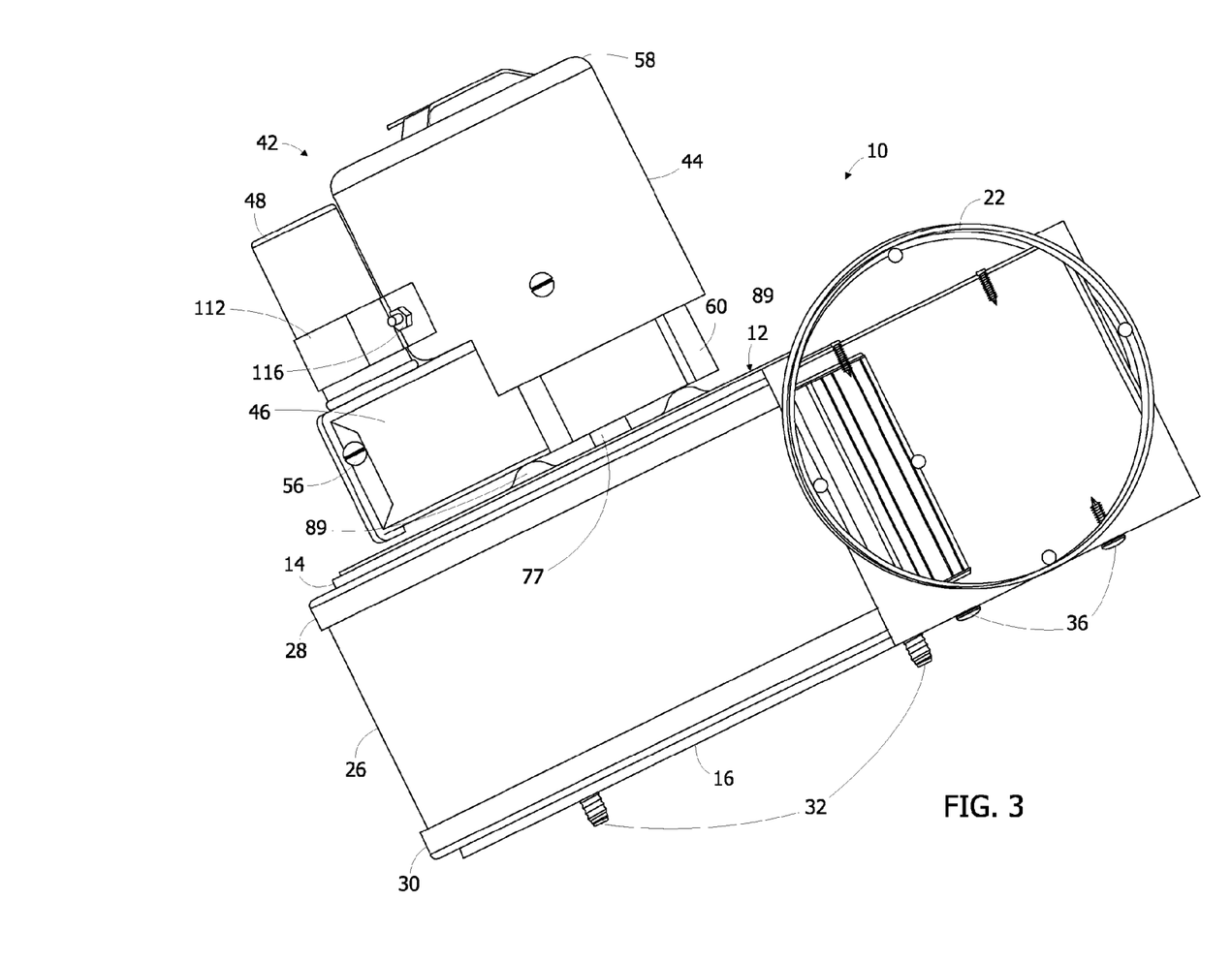
FIG. 3 is a side elevational view of a preferred embodiment of a blower for a standard downdraft gas and/or electric cooktop in accordance with the invention, with the mechanical attachment mechanisms for the blower housing removed.

Referring now to FIG. 2, the housing 12 can be in a wide variety of shapes and sizes with the preferred shape being cylindrical with an outer extension 24 extending toward the outlet 22. A wide variety of geometric shapes will suffice for the outer extension 24, but a rectangular shape is preferred. Referring now to FIGS. 1 and 3, the blower housing 12 also includes sidewalls 26 that extend between the top portion 14 and the bottom portion 16. There is an upper flange member 28 for the top portion 14 that extends over the sidewalls 26 and a lower flange member 30 that also extends over the sidewalls 26. There are a series of attachment mechanisms, e.g., screws, 32 in the bottom portion 16 of the blower housing 12 that provide for attachment of the blower 10 to a standard downdraft gas and/or electric cooktop (not shown).

Referring now to FIGS. 1 and 2, an illustrative, but nonlimiting, example of the outlet 22 includes a coupler 34 that attaches to the outer extension 24. The outlet 22 can be a myriad of geometric shapes and is preferably circular, while the outer extension 24 can also be a myriad of geometric shapes and is preferably rectangular. The coupler 34 transitions between the outlet 22 and the outer extension 24 with the illustrative, but nonlimiting, example being a circular shaped outlet 22 to a rectangular outer extension 24. A wide variety of securing mechanisms 36, e.g., screws, can be used to secure the outlet 22 to the outer extension 24, with the illustrative, but nonlimiting example, of slots 38 in the coupler 34 that allow securing mechanisms 36, e.g., screws, to attach to the outer extension 24 in threaded holes (not shown) located therein. An illustrative, but nonlimiting, number of securing mechanisms 36 include four (4) with two (2) located on top of the outlet 22 and two (2) located on the bottom of the outlet 22.

Referring now to FIG. 2, there are preferably a plurality of mechanical attachment mechanisms 40, e.g., nut and bolt combinations, which connect the top portion 14 of the blower housing 12 to the bottom portion 16 of the blower housing 12 resulting in the sidewalls 26 being secured in place.

As shown in FIGS. 1, 2, 3, 4, and 5, there is a motor assembly that is generally indicated by numeral 42, which includes a motor housing 44, which is otherwise known as a cooling case. There is a conduit box 46 for receiving electrical power that is attached to the motor housing 44. There is a ground lug 49 shown in FIG. 4.

A wide variety of motors 64, shown in FIGS. 6, 7, 8, and 9, may be utilized with the motor assembly 42 of the present invention. A preferred illustrative, but nonlimiting, example of motor 64 is a variation is the permanent-split capacitor ("PSC") motor. This is also known as a capacitor start and run motor. This motor utilizes a starting capacitor inserted in series with the startup windings or second windings (not shown) connected to a power source, e.g., 115 Volts, 60 Hertz, from the conduit box 46 through a capacitor 48, creating an LC circuit which is capable of a much greater phase shift along with run windings (not shown).

The capacitor 48 ranges from 3 to 25 microfarads, e.g., 7.5 microfarads at 370 Volts AC, is connected in series with the "start" windings (not shown) and remains in the circuit during the run cycle. By changing taps on the "running winding" (not shown) for the motor 64, shown in FIGS. 6 through 9, there can be multiple and distinctive speeds, e.g., low speed at 1775 r.p.m. at 0.23 Amperes and 26 Watts for idle and 1000 r.p.m. at 0.78 Amperes and 85 Watts under loaded conditions, medium speed at 1778 r.p.m. at 0.32 Amperes and 36 Watts for idle and 1200 r.p.m. at 0.96 Amperes and 107 Watts under loaded conditions and high speed at 1784 r.p.m. at 0.50 Amperes and 55 Watts for idle and 1400 r.p.m. at 1.26 Amperes and 142 Watts under loaded conditions. Motor wiring connections (not shown) though the conduit box 46 include a wire for common, a wire for ground, a separate wire for each of the three speeds and two wires for the capacitor 48. There is distinctive speed separation with a PSC motor. An illustrative, but nonlimiting, example of an permanent-split capacitor ("PSC") motor 64 for the present invention, includes No. 70903281, Type U90B1, which is manufactured by Regal Beloit Corporation (Fasco Motors Group), having a place of business at 200 State Street, Beloit, Wis. 53511-6254.

Figure 4:
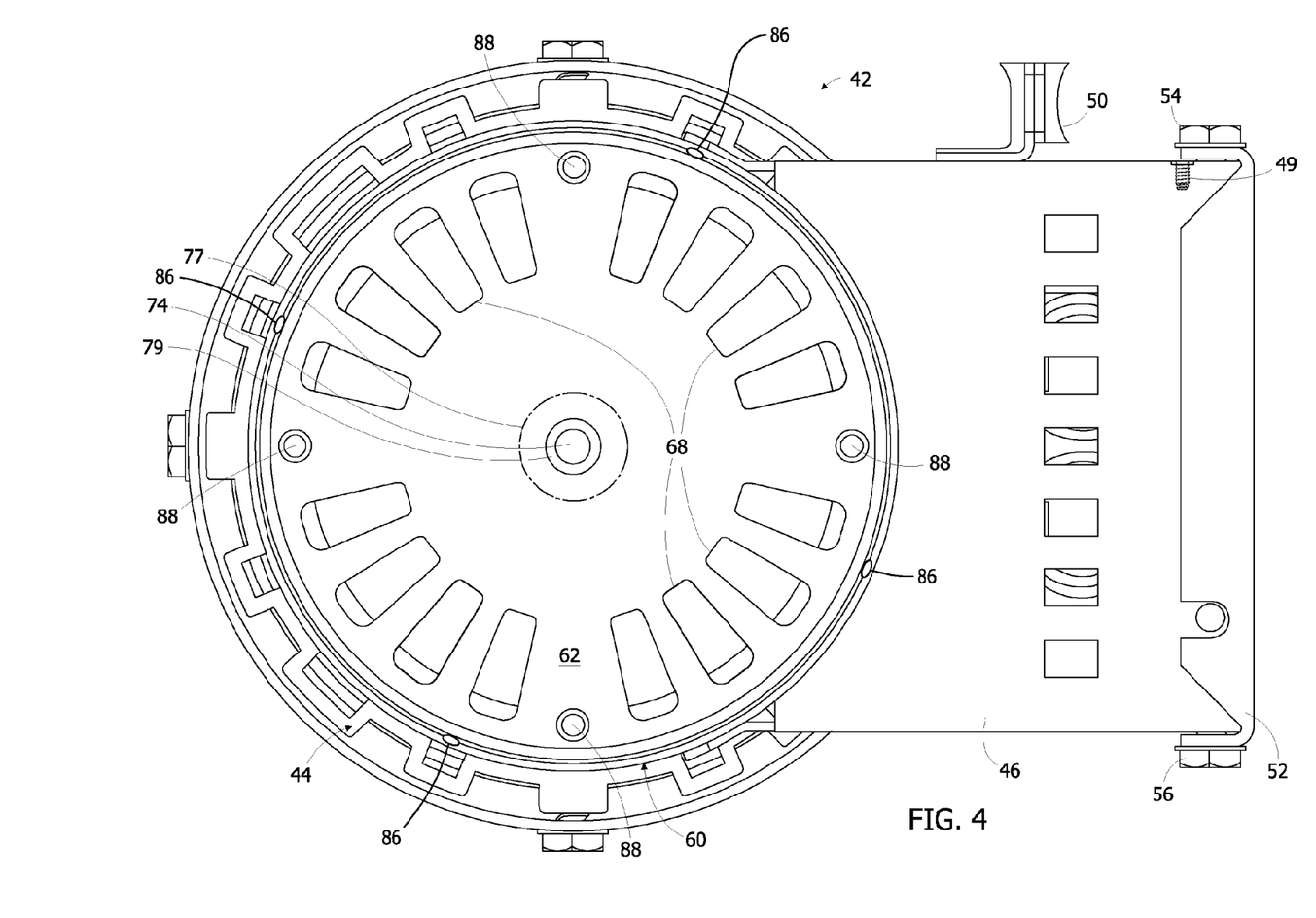
FIG. 4 is a bottom view of a preferred embodiment of a motor assembly associated with a blower for a standard downdraft gas and/or electric cooktop in accordance with the invention.
Figure 5:
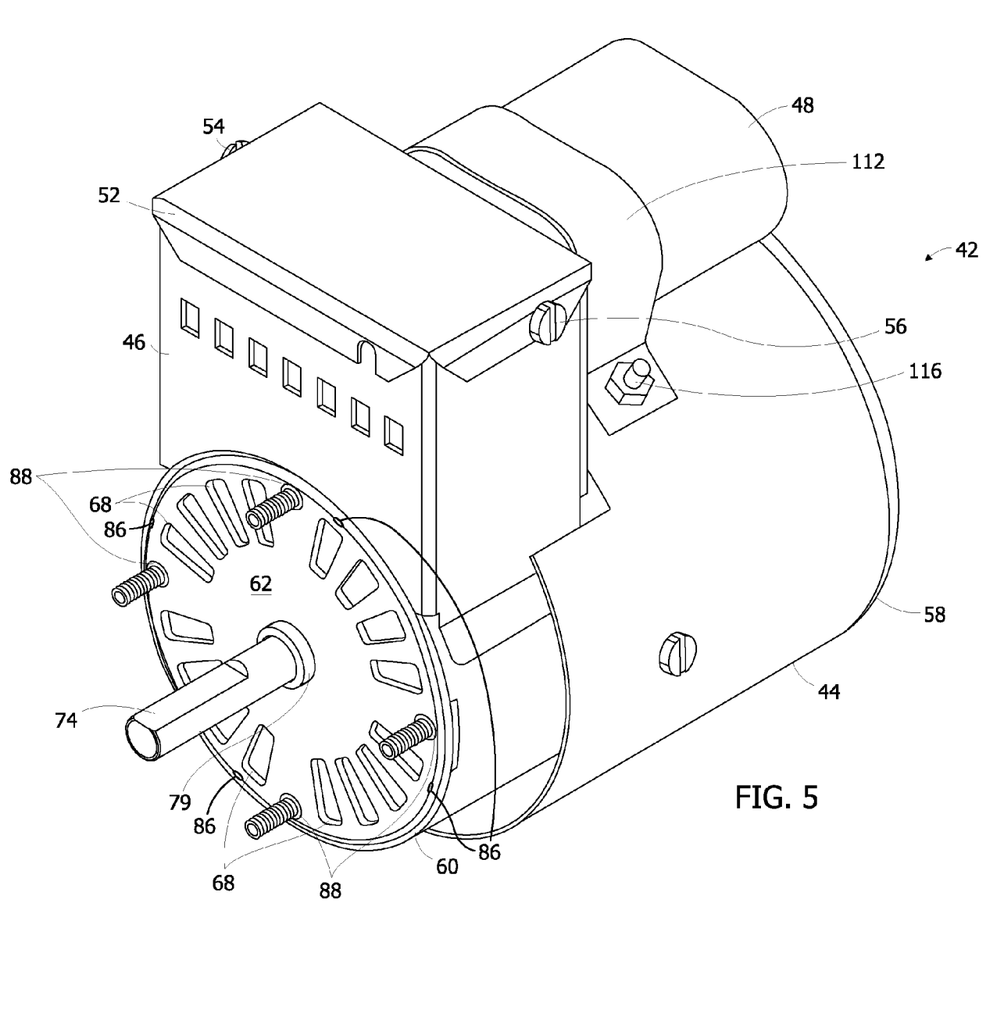
FIG. 5 is a perspective view of a preferred embodiment of a motor assembly associated with a blower for a standard downdraft gas and/or electric cooktop in accordance with the invention.
Figure 6:
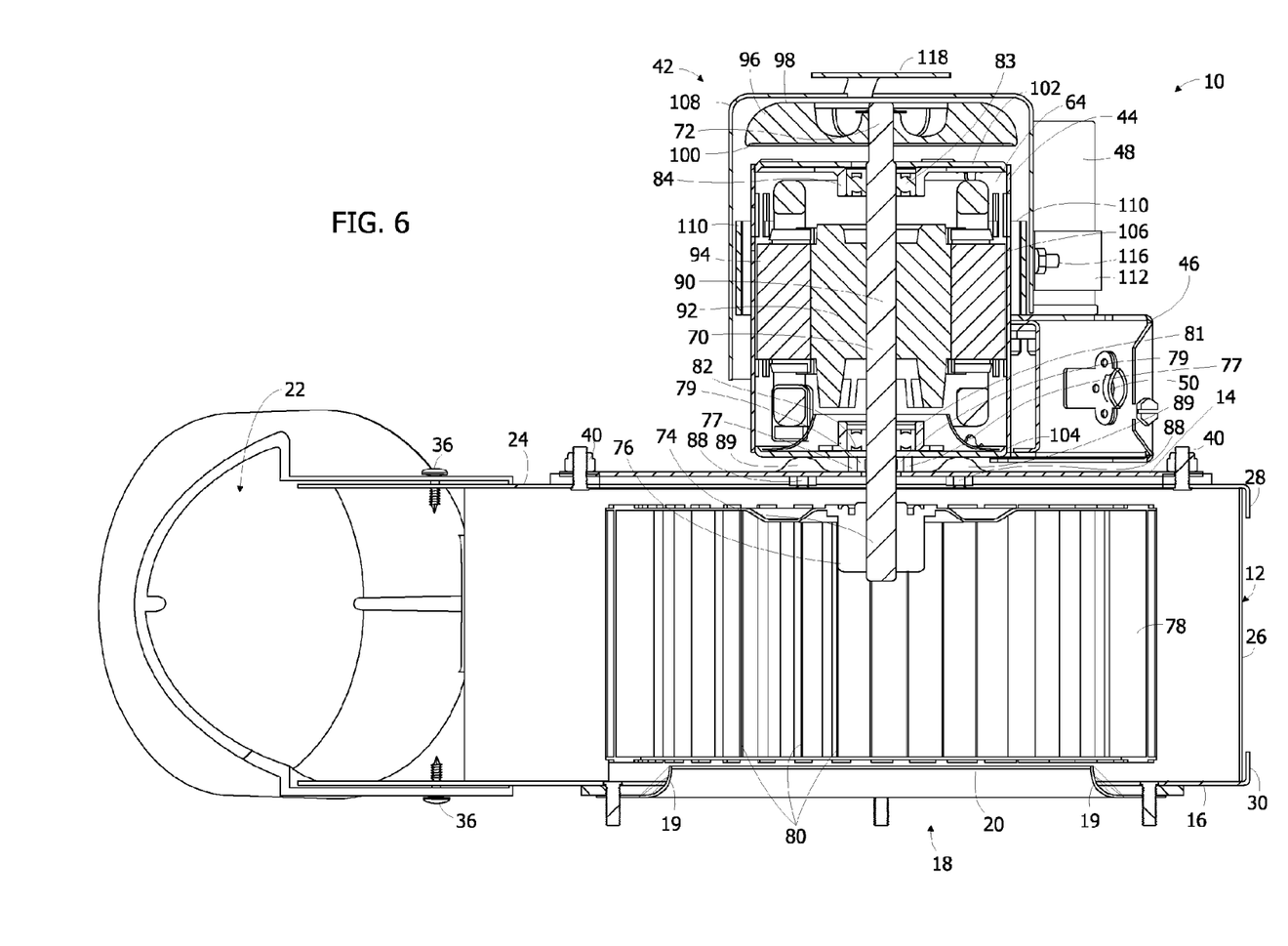
FIG. 6 is a cut-away front view through the longitudinal axis of a preferred embodiment of a blower for a standard downdraft gas and/or electric cooktop in accordance with the invention.
Figure 8:
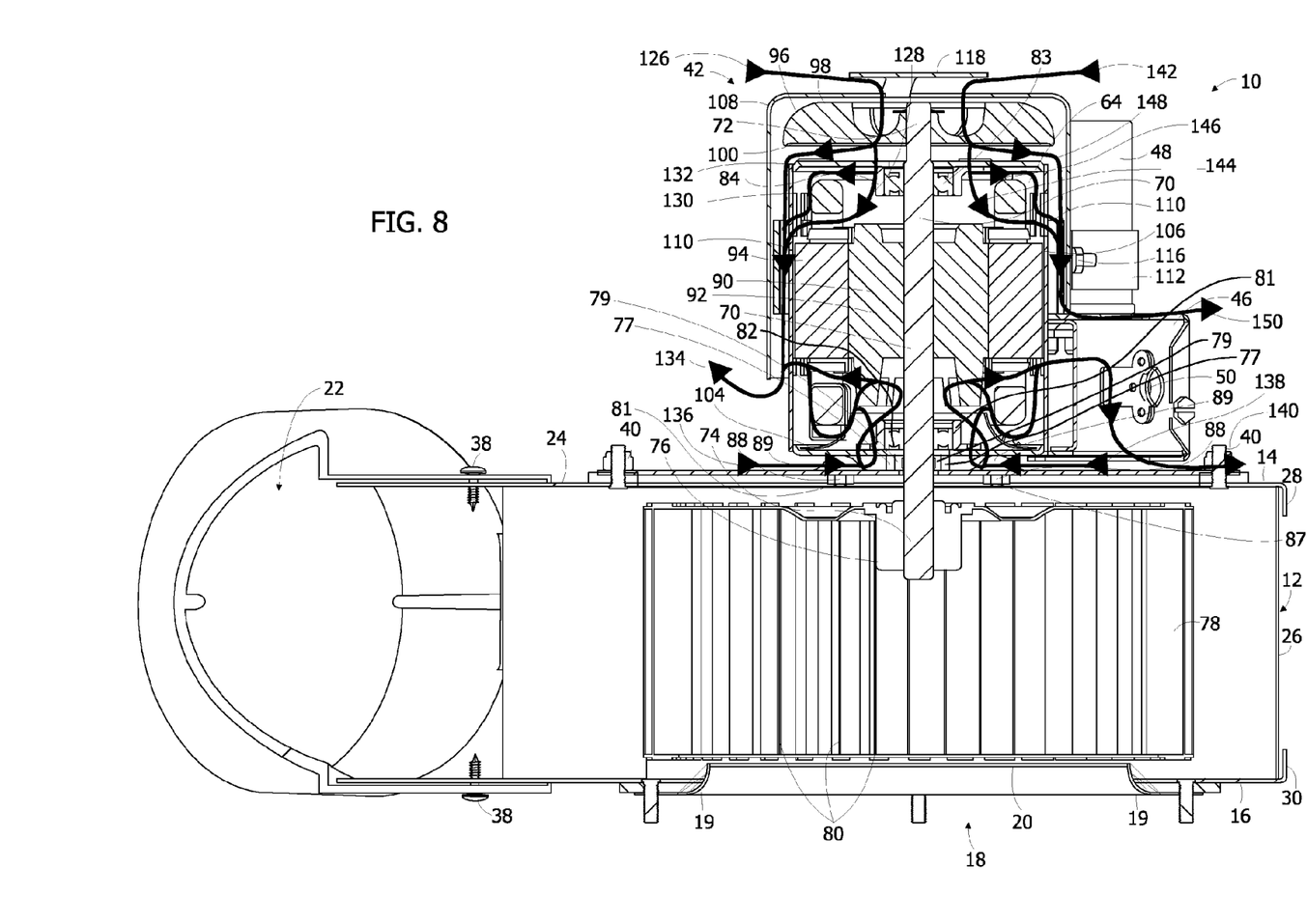
FIG. 8 is identical to FIG. 6 with the addition of air flow indicated both into and out of the motor assembly for the blower for a standard downdraft gas and/or electric cooktop in accordance with the invention.

The conduit box 46 also includes a cord strain relief 50, shown in FIGS. 4, 6 and 8. There is a lid 52 for the conduit box 46 that is attached to the conduit box with a first attachment mechanism 54, e.g., threaded screw, and a second attachment mechanism 56, e.g., threaded screw, as shown in FIGS. 1, 2, 3, 4 and 5.

Referring now to FIGS. 1, 3 and 5, there is a top portion 58 of the motor housing 44 and a bottom portion 60 of the motor housing 44. Referring now to FIGS. 4 and 5, the bottom portion 60 of the motor housing 44 includes a plate 62 with a plurality of vents 68, e.g., sixteen (16) for providing cold air intake into the motor housing 44 for cooling. The plate 62 is attached to the bottom portion 60 of the motor housing 44 by a series of spot welds 86, e.g., Typ four (4), or any of a wide variety of attachment mechanisms. The vents 68 can be any of wide variety of shapes and sizes with the preferred illustrative, but nonlimiting, configuration being a tapered oval.

Figure 7:
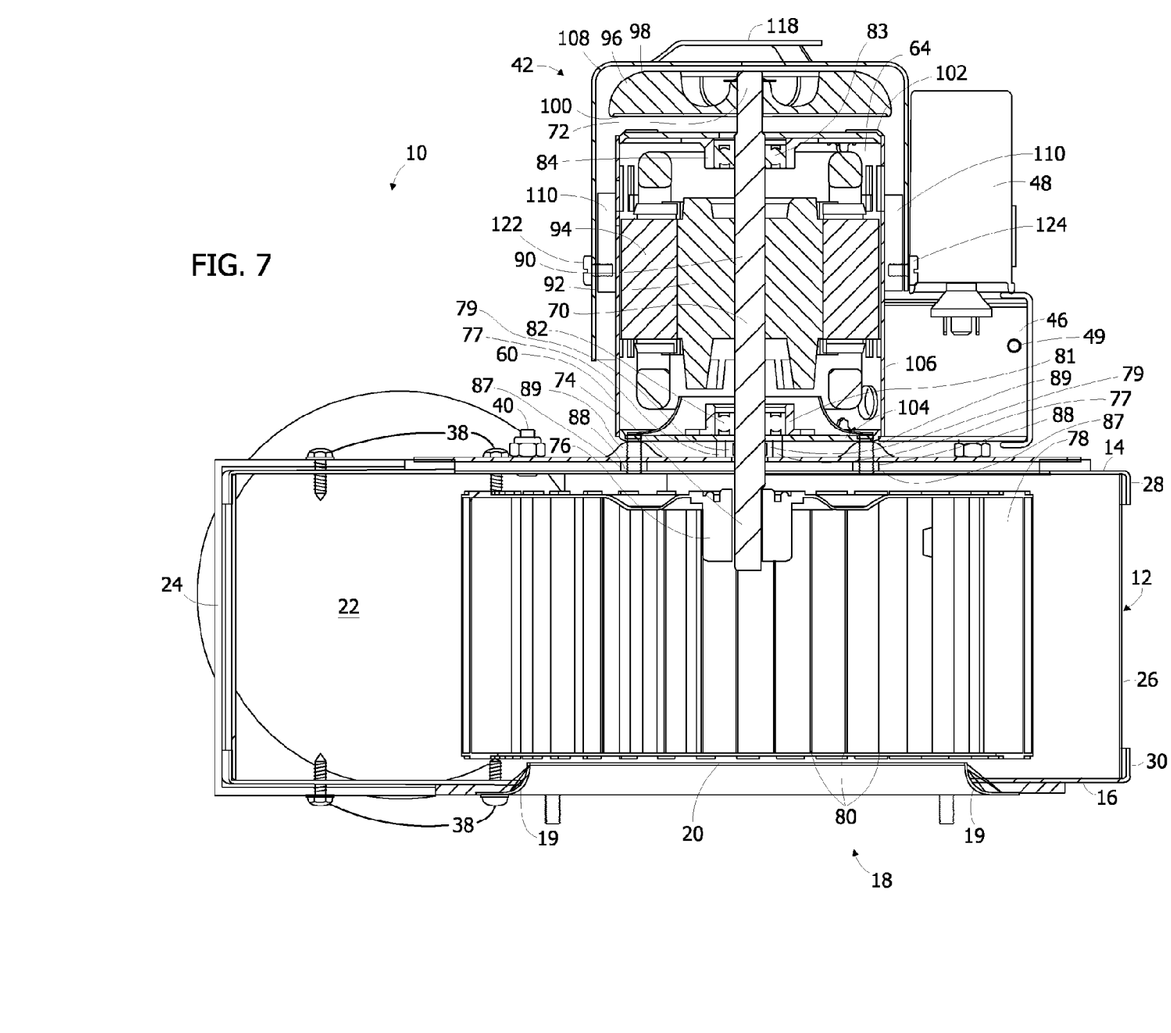
FIG. 7 is a cut-away front view through the longitudinal axis of a preferred embodiment of a blower for a standard downdraft gas and/or electric cooktop in accordance with the invention.

Referring now to FIGS. 6 and 7, the motor 64 includes a rotatable rotor 70, having a top portion 72 and a bottom portion 74. The bottom portion 74 of the rotor 70 can be removably attached to a receptacle 76. The receptacle 76 is fixedly or removably attached to a fan 78 that is rotatable. Therefore, the smoke, fumes and other airborne discharge created during the cooking process will come into the inlet 18 past the curved sidewalls 19 and into the inlet screen 20 by the rotation of the fan 78 and then out of the blower housing 12 that is sealed. This includes the top portion 14, bottom portion 16, and sidewalls 26 of the blower housing 12 through the outlet extension 24 through the outlet 22. Therefore, the motor 64 and the associated cooling system is completely independent and does not use the air having the smoke, fumes and other airborne discharge from the downdraft cooking process to cool the motor 64. Since this cooling system for the motor 64 is completely independent, there is no fluctuation with regard to system resistance to the blower 10. Consequently, when system resistance is encountered, the motor 64 does not provide warm grease laden air when rotation of the rotor 70 is reversed. This results in a significant improvement over prior systems when grease laden air cannot escape the blower 10 and then contaminate the room. Moreover, a HEPA filter (not shown) can be utilized in a ductless application. As shown in FIG. 1, the fan 78 can be any of a myriad of geometric shapes and configurations, with the illustrative and nonlimiting example being that of a hollow cylindrical structure with a plurality of protruding ridges 80.

Referring again to FIGS. 6 and 7, the bottom portion 74 of the rotor 70, having a first flange member 81, is rotatably held in position by a first sealed bearing 82 and the top portion 72 of the rotor 70, having a second flange member 84, is rotatably held in position by a second sealed bearing 83. When the bottom portion 74 of the rotor 70 passes between the bottom portion 60 of the motor housing 44 to the top portion 14 of the blower housing 12, there are a plurality of connectors 88, e.g., four (4) connector bolts and associated nut combinations.

As best shown in FIG. 4, there is a finned end ring venturi 77 positioned around a shaft seal 79 to enclose the bottom portion 74 of the rotor 70 passes between the bottom portion 60 of the motor housing 44 to the top portion 14 of the blower housing 12. The shaft seal 79 prevents the grease laden air from escaping from the blower housing 12 and into the consumer's environment but does not have any influence on the cooling system for the motor 64. The shaft seal 79 is sandwiched between the bottom portion 60 of the motor housing 44 and blower housing 12 but does not touch the bottom portion 74 of the rotor 70, e.g., shaft. The smaller the distance between the bottom portion 60 of the motor housing 44 to the top portion 14 of the blower housing 12, the easier it will be to pass the Underwriter's Laboratories (hereinafter, "UL") Articulating Probe Test and the UL Knife Probe test, which is a significant advantage of the present invention. There are a series of raised embossments 89, e.g., four, that operate as spacers and elevate the bottom portion 60 of the motor housing 44 in relationship to the top portion 14 of the blower housing 12 and are secured to the top portion 14 of the blower housing 12 by a series of attachment mechanisms 93, e.g., four screws.

The rotor 70 also includes a middle portion 90. Preferably, but not necessarily this middle portion 90 extends outward from the rotor 70 and includes fins 92. Preferably, but not necessarily, this middle portion 90 of the rotor 70 is cylindrical. This middle portion 90 of the rotor 70 is surrounded by the stator 94 and is rotatable therein. The top portion 72 of the rotor 70 is attached to a rotatable member 96 that has a top portion 98 and a bottom portion 100, where the top portion 98 of the rotatable member 96 has a smaller radius than the bottom portion 100 of the rotatable member 96 with a curved arc between the top portion 98 of the rotatable member 96 and the bottom portion 100 of the rotatable member 96 to form an umbrella fan as an illustrative, but nonlimiting example. The rotatable member 96 is preferably, but not necessarily cylindrical.

There is a top support member 102 that is attached to the second sealed bearing 83 and a bottom support member 104 that is attached to the first sealed bearing 82. Attached to the top support member 102 and the bottom support member 104 is a cooling band 106 that surrounds the outside of the stator 94. The bottom support member 104 is located between the first sealed bearing 82 and the spacers 89, e.g., four (4) raised embossments located on top portion 14. The top support member 102, bottom support member 104, and cooling band 106 are all preferably, but not necessarily, cylindrical. The windings (not shown) on the stator 94 are electrically connected (not shown) through the conduit box 46. The conduit box 46 is adjacent to the cooling band 106. The top portion of the motor housing 44 includes an outer enclosure 108 that extends over the top of the rotatable member 96 and is adjacent to the capacitor 48. There is a sleeve member 110 located between the cooling band 106 and the outer enclosure 108 with a first attachment mechanism, e.g., threaded screw 122 that connects the sleeve member 110 to the outer enclosure 108. There is a second attachment mechanism, e.g., threaded screw 124 that connects the sleeve member 110 to the outer enclosure 108.

The capacitor 48 can be secured to the outer enclosure 108 by a wide variety of mechanisms. An illustrative, but nonlimiting, example includes a strap 112 that is attached to the outer enclosure 108 by a first attachment mechanism, e.g., threaded screw, 114, and a second attachment mechanism, e.g., threaded screw 116, as shown in FIG. 2.

Mounted to the top of the outer enclosure 108 is an air intake cap 118 that provides locations for cooling air to be delivered to the inside of the motor housing 44. The air intake cap 118 provides a plurality of air vents 120, as shown in FIG. 2. A preferred, but nonlimiting, number of air vents would include three (3); however, any number may suffice.

Figure 9:
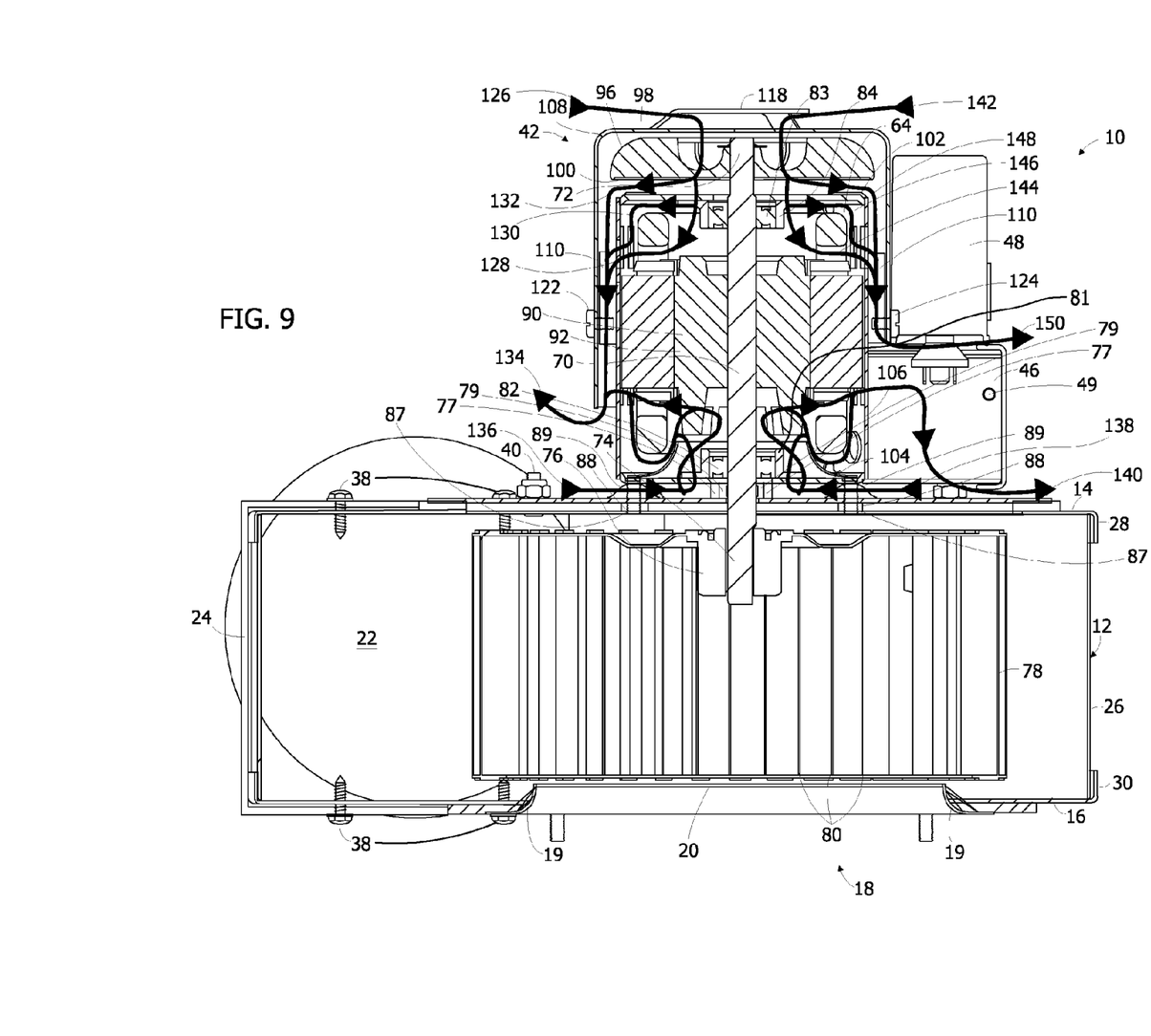
FIG. 9 is identical to FIG. 7 with the addition of air flow indicated both into and out of the motor assembly for the blower for a standard downdraft gas and/or electric cooktop in accordance with the invention.

Referring now to FIGS. 8 and 9, first cooling air stream 126 that is drawn into the outer enclosure 108 by the rotatable member, e.g., umbrella fan, 96 and then splits into a second cooling air stream 128 that passes through the stator 94, a third cooling air stream 130 that passes over the outside of the stator 94, and a fourth cooling air stream 132 that passes between the outer enclosure 108 and the cooling band 106. The second cooling air stream 128, the third cooling air stream 130, and the fourth cooling air stream 132 then recombine to form a fifth cooling air stream 134 that exits the motor housing 44. There is a sixth cooling air stream 136 that enters through the plurality of vents 68, which appear to be hidden, in the bottom portion 60 of the motor housing 44 and flows around the finned end ring venturi 77 with splitting and reconnecting to join and combine with the fifth cooling air stream 134. There is a seventh cooling air stream 138 that enters through the plurality of vents 68, which also appear to be hidden, in the bottom portion 60 of the motor housing 44 and flows around finned end ring venturi 77 with splitting and reconnecting and then exit through an opening in the conduit box 46 as an eighth cooling air stream 140. There is a ninth cooling air stream 142 that is drawn into the outer enclosure 108 by the rotatable member, e.g., umbrella fan, 96 and then splits into a tenth cooling air stream 144 that passes through the stator 94, an eleventh cooling air stream 146 that passes over the outside of the stator 94, and a twelfth cooling air stream 148 that passes between the outer enclosure 108 and the cooling band 106. The tenth cooling air stream 144, the eleventh cooling air stream 146, and the twelfth cooling air stream 148 then recombine to form a thirteenth cooling air stream 150 that exits the motor housing 44.

The blower 10 reduces vibration significantly from prior systems, e.g., sixty-five percent (65%), noise, e.g., twenty-five percent (25%) and energy, e.g., twenty percent (20%). This blower 10 works in an elevated ambient, and only due to the completely integrated nature of this cooling system can this blower 10 operate.

Furthermore, it should be understood that when introducing elements of the present invention in the claims or in the above description of the preferred embodiment of the invention, the terms "have," "having," "includes" and "including" and similar terms as used in the foregoing specification are used in the sense of "optional" or "may include" and not as "required." Similarly, the term "portion" should be construed as meaning some or all of the item or element that it qualifies.

Thus, there have been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A blower for a downdraft cooktop comprising:
a blower housing, having a first portion and a second portion, which includes an inlet that can be fluidly coupled to a downdraft cooktop and an outlet for removing air from the blower housing;
a fan located between the inlet and the outlet of the blower housing;
a motor having a rotor with a shaft, having a first portion and a second portion, and a stator, wherein the second portion of the rotor is operatively attached to the fan;
a rotatable member operatively attached to the first portion of the rotor; and
a motor housing enclosing the motor, the motor housing having a first portion, a second portion, at least one inlet opening and at least one outlet opening, a first support member, at least one cooling band, an outer enclosure, and a second support member, wherein air for cooling the motor is drawn through the at least one inlet opening of the motor housing through the rotation of the rotatable member and dispelled through the at least one outlet opening of the motor housing so that cooling of the motor does not require direct access to air located within the blower housing, wherein the first support member, the at least one cooling band, and the second support member are connected together to enclose the rotor and stator of the motor, wherein the rotatable member is positioned between the outer enclosure and the first support member, and wherein the second support member includes a plate having a plurality of vents that is capable of drawing air with the rotatable member in fluid relationship with the rotor and the stator prior to exiting through at least one outlet opening in a lower portion of the motor housing;
a seal positioned and adapted to prevent grease laden air from passing from the blower housing into the motor housing; and
an air intake cap located adjacent to the outer enclosure that includes at least one air vent for drawing air by the rotatable member into the motor housing in fluid relationship with the first support member and the stator before exiting through at least one outlet opening in the outer enclosure.

2. A blower for a downdraft cooktop comprising:
a blower housing, having a first portion and a second portion, which includes an inlet that can be fluidly coupled to a downdraft cooktop and an outlet for removing air from the blower housing;
a fan located between the inlet and the outlet of the blower housing;
a motor having a rotor with a shaft, having a first portion and a second portion, and a stator, wherein the second portion of the shaft for the rotor is attached to the fan and the first portion of the shaft for the rotor is attached to a rotatable member; and
a seal adjacent the motor shaft adapted and configured to prevent grease laden air from passing from the blower housing into the motor housing; and
a housing for the motor having a first support member, at least one cooling band, a second support member, wherein the first support member, the at least one cooling band and the second support member are connected together to enclose the rotor and the stator of the motor, and an outer enclosure that is positioned above the rotatable member, wherein the rotatable member can draw air through at least one inlet opening in the outer enclosure in fluid relationship with the first support member and the stator before exiting through at least one outlet opening in the outer enclosure and the rotatable member can draw air through at least one inlet opening in the second support member in fluid relationship with the rotor and the stator prior to exiting through at least one outlet opening in a lower portion of the motor housing so that cooling of the motor does not require direct access to air located within the blower housing.

3. The blower for a downdraft cooktop as set forth in claim 2, wherein the rotatable member is cylindrical.

* * * * *